United States Patent [19]
Morimoto et al.

[11] Patent Number: 4,792,023
[45] Date of Patent: Dec. 20, 1988

[54] BRAKE CONTROL METHOD AND APPARATUS FOR A VEHICLE

[75] Inventors: Hideyuki Morimoto; Ryuichi Tanaka, both of Kanagawa, Japan

[73] Assignees: Fuji Heavy Industries, Ltd.; Nippon Air Brake Co., Ltd., both of Japan

[21] Appl. No.: 71,563

[22] Filed: Jul. 8, 1987

Related U.S. Application Data

[63] Continuation of Ser. No. 797,941, Nov. 14, 1985, abandoned.

[30] Foreign Application Priority Data

Nov. 16, 1984 [JP] Japan .................... 59-241740
Apr. 25, 1985 [JP] Japan .................... 60-90493

[51] Int. Cl.$^4$ ............................................ B60T 11/28
[52] U.S. Cl. ............................ 188/353; 116/28 R; 180/286; 188/151 A; 188/349; 188/1.11; 303/6.1; 340/52 D
[58] Field of Search .............. 188/151 A, 353, 349, 188/136, 331, 346, 141, 1.11; 192/1.33, 1.35; 303/6.1; 116/28 R; 180/281, 286; 340/52 D

[56] References Cited

U.S. PATENT DOCUMENTS

| | | | |
|---|---|---|---|
| 3,346,078 | 10/1967 | Dobb | 188/346 |
| 3,384,423 | 5/1968 | Cumming | 188/349 X |
| 3,651,457 | 3/1972 | Sprouse | 340/52 D X |
| 3,699,679 | 10/1972 | Bardos et al. | 303/6 C X |
| 3,949,845 | 4/1976 | Newstead et al. | 188/331 |
| 4,247,154 | 1/1981 | Shoji et al. | 303/24 A |
| 4,292,883 | 10/1981 | Riquast et al. | 303/6 C X |
| 4,533,028 | 8/1985 | Taig | 192/13 A |

FOREIGN PATENT DOCUMENTS

| | | | |
|---|---|---|---|
| 53423 | 4/1979 | Japan | 188/151 A |
| 90447 | 6/1982 | Japan | 340/52 D |
| 146653 | 8/1954 | Sweden | 192/3 TR |

*Primary Examiner*—George E. A. Halvosa
*Attorney, Agent, or Firm*—Jones, Day, Reavis, & Pogue

[57] ABSTRACT

A brake control apparatus for a vehicle includes a brake apparatus of the drum brake type; an electromagnetic valve arranged in a conduit between a wheel cylinder and a master cylinder; and a detector for detecting one directional movement of the brake friction members of the brake apparatus due to a backward rotational force of a wheel and another directional movement of the brake friction members due to a forward rotational force of the wheel when the brake friction members are pressed to the frictional surface of the rotator. The brake friction members being able to move within a predetermine range in accordance with the torque of the wheel. The detector includes a slide anchor slidably fitted to a through hold in a stationary anchor, the brake friction members being engaged with the slide anchor, and an electrical switch for detecting the movement of the slide anchor. The valve being closed and opened by the detecting output of the electrical switch. The brake apparatus further includes a spring extended between a stationary part of the brake and a brake friction member such that the one friction member is always pushed to the slide anchor by the spring, so that the electrical switch is normally held in the OFF state.

4 Claims, 3 Drawing Sheets

BRAKE CONTROL METHOD AND APPARATUS FOR A VEHICLE

This is a continuation of application Ser. No. 797,941, filed 11-14-85, now abandoned.

BACKGROUND OF THE INVENTION

1. Field of the Inventions

This invention relates to a brake control method and apparatus for a vehicle.

2. Description of the Prior Art

For example, U.S. Pat. No. 4,247,154 discloses the brake control apparatus in which the valve apparatus interconnected to a clutch pedal is closed by treading the clutch pedal and so the brake fluid pressure is held in the wheel cylinder of the automobile on the upwardly inclined roadway. Thus, the driver can release the foot from the brake pedal, while the automobile can be maintained to stop on the upwardly inclined roadway. However, the clutch pedal should continue to be trodden for holding the brake fluid pressure.

To start the automobile, the driver or operator shifts the gears and gradually releases the clutch pedal from treading. The clutch mechanism connected to the clutch pedal through the wire is put into the semi-clutching condition. In such a condition, the driver steps on the accelerator pedal to raise the speed of the engine. Thus, the automobile starts to run.

As above described, when the automobile should be brought to a stop facing upwardly on an inclined roadway, the clutch pedal is trodden to close the valve apparatus. And when the automobile is started to run, the clutch pedal is released to open the valve apparatus. However, when parts related to the valve apparatus or clutch pedal such as a clutch friction lining wears, the relationship changes between the pushed position of the clutch pedal and the timing of transmitting the drive force sufficient to start the automobile from the engine to the wheel through the clutch friction lining, although the relationship is constant between the pushed position of the clutch pedal and the timing of opening the valve apparatus. Thus, before the drive force sufficient to start the automobile is transmitted to the wheel, the braking force is relieved.

In the prior art, when the position of the clutch pedal puts the clutch apparatus into the semi-clutch condition, the braking force is set to be relieved. However, when the clutch friction lining wears, the position of the clutch pedal for putting into the semi-clutch condition changes. The timing of relieving the braking force is not changed with the position of the clutch pedal for putting into the semi-clutch condition. That is the reason for the above-described disadvantage.

When the timing of transmitting the sufficient drive force to the wheel does not correspond with the timing of relieving the braking force, there is the danger that the automobile is moved backwards to cause an accident on the start on the upwardly inclined roadway.

SUMMARY OF THE INVENTION

Accordingly, it is an object of the invention to provide a brake control method and apparatus for vehicle which can effect a proper operation in accordance with the condition of the wheel or body on the start and stop of the automobile.

In accordance with an aspect of this invention, a brake control method for a vehicle includes (A) the step of detecting the tendency of the backward movement due to gravity, of the vehicle stopped by the brake facing upwardly on an inclined roadway after dissipation of the forward inertia of the vehicle, by the change of the reacting direction of the frictional force between brake friction means in a brake apparatus and a rotator rotated with a wheel; (B) the step of holding the braking force on the basis of the detecting step; (C) the step of detecting the change of the reacting direction of the frictional force due to the transmission of the drive force to the wheel for the start of the vehicle on the inclined roadway; and (D) the step of relieving the braking force on the basis of the detecting step (C).

In accordance with another aspect of the invention, a brake control apparatus for a vehicle includes (A) a brake apparatus in which brake friction means is pressed to a frictional surface of a rotator rotated with a wheel by supply of pressurized fluid on the basis of a driver's operation; (B) conduit means for supplying the pressurized fluid to the brake apparatus from a master cylinder; (C) a valve arranged in the conduit means, being closed by an external instruction and prohibiting at least one fluid flow from the brake apparatus side towards the master cylinder side; (D) detecting means for detecting one directional movement of the brake friction means due to a backward rotational force of a wheel and another directional movement of the brake friction means due to a forward rotational force of the wheel during pressing of the brake friction means to the frictional surface of the rotator, the brake friction means being able to move within as predetermined range in accordance with the torque of the wheel; and (E) valve drive means for closing the valve in accordance with the detection of the one directional movement by the detecting means, and for opening the valve in accordance with the detection of the other directional movement by the detecting means.

The foregoing and other objects, features, and advantages of the present invention will be more readily understood upon consideration of the following detailed description of the preferred embodiment of the invention, taken in conjunction with the accompanying drawings.

DESCRIPTION OF THE PREFERRED EMBODIMENTS

First, an operation principle of this invention will be described with reference to FIG. 1, before describing embodiments of this invention.

Figure 1:
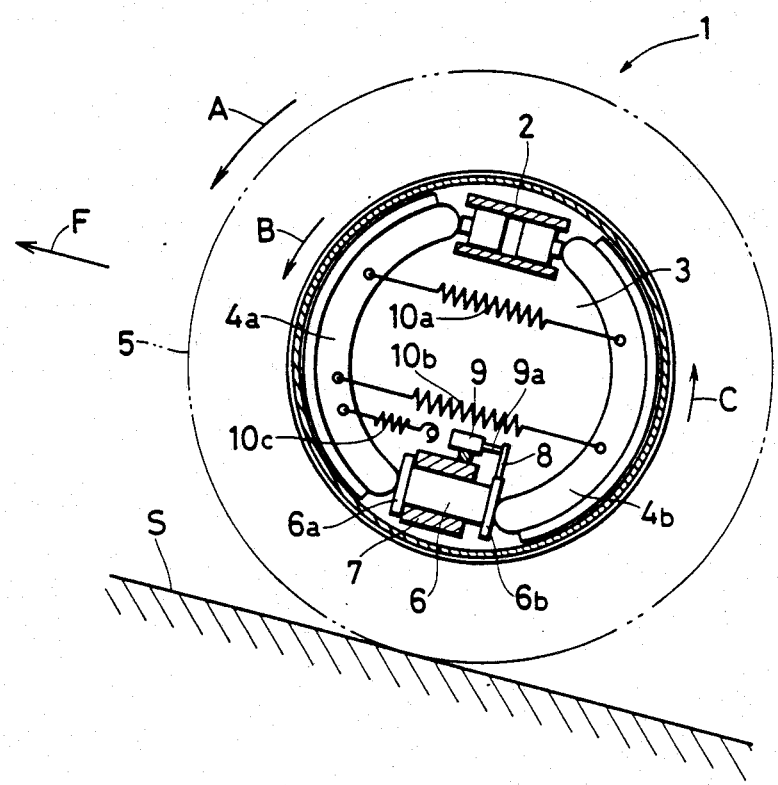
FIG. 1 is a schematic side view of a wheel running on an inclined roadway for explaining an operation principle of this invention.

It is assumed in FIG. 1 that the automobile provided with a wheel 1 runs on an inclined roadway S in a direction shown by the arrow F. Accordingly, the wheel 1 rotates in a direction shown by the arrow A. It is provided with a brake apparatus called "drum brake".

As well known, a backplate 3 is fixed to a chassis side. A wheel cylinder 2 is fixed on the backplate 3. Upper ends of a pair of bow-shaped shoes 4a and 4b are pivoted to the ends of the wheel cylinder 2. Lower ends of the shoes 4a and 4b contact with both end portions 6a and 6b of a slide anchor 6 which is slidably fitted to a through hole of an anchor body 7 fixed to the backplate 3. The end portions 6a and 6b of the slide anchor 6 are flange-like. The right and left positions of the slide anchor 6 are determined by the end portions 6a and 6b contact with end surfaces of the anchor body 7. In FIG. 1, the one end portion 6a contacts with the one end surface of the anchor body 7, and so the right position of the slide anchor 6 is shown.

A switch operating rod 8 is fixed to the other end portion 6b, and contacts with an actuator 9a of a switch 9 fixed on the anchor body 7. The actuator 9a is urged rightwards by a spring included in the switch 9. In the shown condition, the switch 9 is turned off.

The shoes 4a and 4b are urged inwards by return springs 10a and 10b. A spring 10c is extended between the back plate 3 and the one shoe 4a so as to urge the latter to the end portion 6a of the slide anchor 6, and always to contact the shoe 4a with the end portion 6a. Thus, the switch 9 can be prevented from errorneously operating due to rocking of the shoes 4a and 4b.

The above-described brake apparatus is so called "LT-type drum brake". The one shoe 4a is called "leading shoe". The other shoe 4b is called "trailing shoe". When a brake pedal not shown in FIG. 1 is trodden to stop the automobile, pressurized fluid is supplied to the wheel cylinder 2, and so brake linings of the shoes 4a and 4b are pressed to a rotator 5 rotated with the wheel 1. A frictional force in the opposite direction to the rotational direction (shown by the arrow A) of the rotator 5 occurs between the shoes 4a and 4b, and the rotator 5. It is the braking force. However, brake reacting forces in the directions shown by the arrows B and C occur, and they are as large as the frictional force and opposite to it. The pushing force of the one piston of the wheel cylinder 2 and the brake reacting force B are applied to the leading side shoe 4a, and contact the latter to the one end portion 6a of the slide anchor 6. The difference between the pushing force of the other piston of the wheel cylinder 2 and the brake reacting force C is applied to the trailing side shoe 4b, and contact the latter to the other end portion 6b of the slide anchor 6. The leading side shoe 4a is made to stronger contact with the one end portion 6a, due to "self-servo operation". Thus, the rightward pushing force to the slide anchor 6 is larger. Accordlingly, the slide anchor 6 remains located at the right position as shown in FIG. 1. The switch 9 remains turned off.

The automobile stops. The clutch is cut off. The wheel 1 receives a rotational force in the opposite direction to the direction shown by the arrow A, due to gravity. Thus, it receives a back torque so that the automobile tends to move towards a lower position. The frictional force between the shoes 4a and 4b, and the rotator 5 is inverted into the direction as shown by the arrow B or C. It becomes larger at the trailing side shoe 4b. Accordingly, the slide anchor 6 is slid leftwards, and takes the left position. Thus, the actuator 9a of the switch 9 is pushed to turn on. An electro-magnetic valve to be hereinafter described, is closed by the "ON" signal. The master cylinder side is intercepted from the wheel cylinder 2. The braking force is held without treading the brake pedal. The clutch pedal may be released from treading, in the neutral position.

To start the automobile, the clutch pedal is so trodden as to put the clutch apparatus into the semi-clutch condition, and the acceleration pedal is so trodden as to transmit the drive torque to the wheel 1 or rotator 5 in the direction as shown by the arrow A. The frictional force between the shoes 4a and 4b, and the rotator 5 is again inverted. The brake reaction forces in the directions as shown by the arrows B and C are applied to the shoes 4a and 4b. The slide anchor 6 is moved rightwards.

Thus, the switch 9 is turned off, and the electro-magnetic valve not shown in FIG. 1 is opened. The communication is made between the master cylinder side and the wheel cylinder side. The pressurized fluid is released from the wheel cylinder 2, and it is returned to the master cylinder. Thus, the brake is relieved, and the automobile is started.

Next, a brake control apparatus according to a first embodiment of this invention will be described with reference to FIG. 2. Parts in FIG. 2 which correspond to those in FIG. 1, are denoted by the same reference numerals, the detailed description of which will be omitted.

Figure 2:
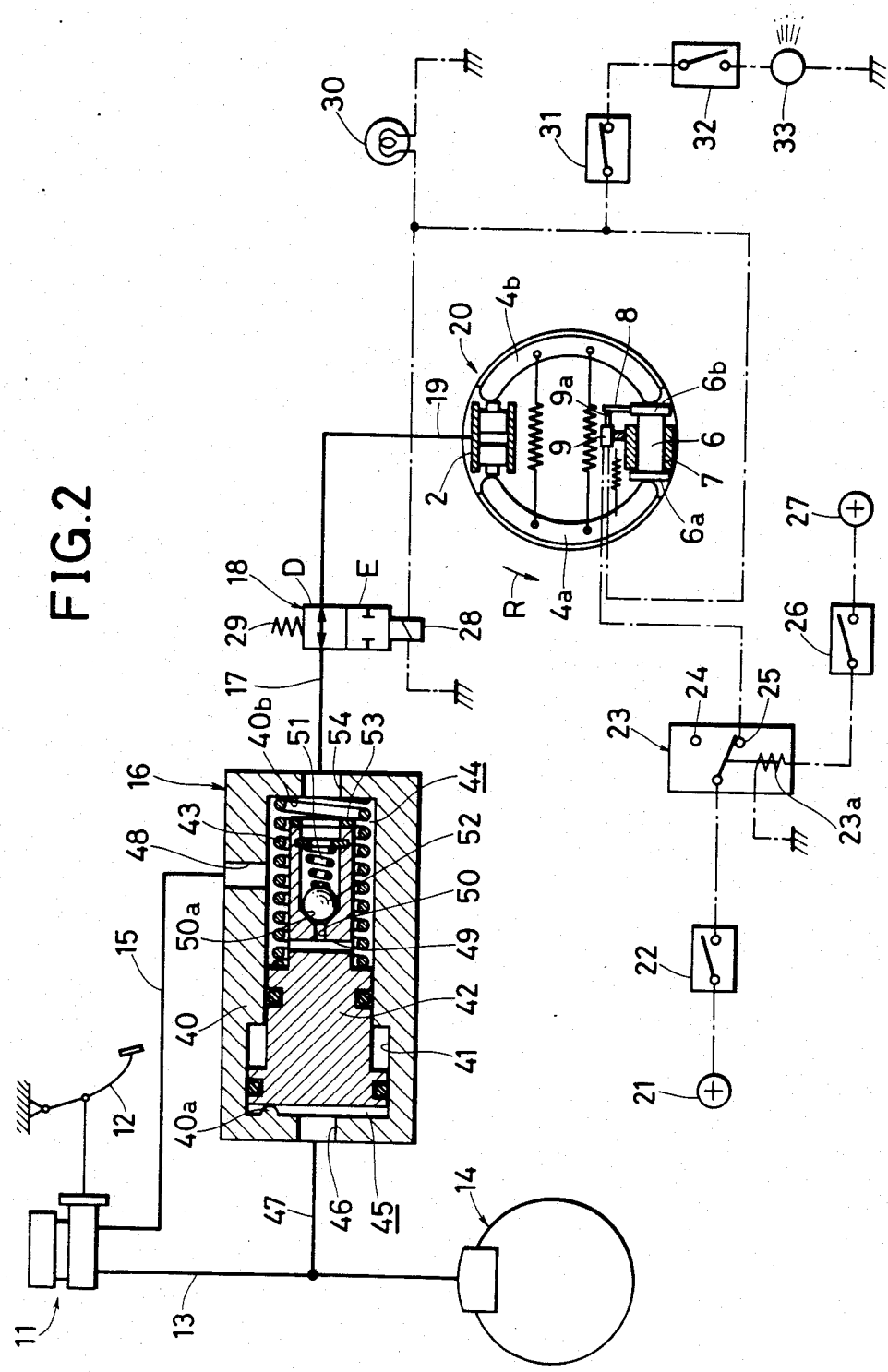
FIG. 2 is a schematic view of a brake control apparatus according to a first embodiment of this invention.

In FIG. 2, a brake pedal 12 is combined with a tandem master cylinder 11. A first fluid pressure generating chamber of the tandem master cylinder 11 is connected to a wheel cylinder of a front wheel 14 through a conduit 13. A disk brake is employed for the front wheel 14. A second fluid pressure generating chamber of the tandem master cylinder 11 is connected to a wheel cylinder 2 of a rear wheel 20 through a conduit 15, a valve apparatus 16 to be described hereinafter in detail, a conduit 17, an electro-magnetic valve 18 and a conduit 19. In FIG. 2, the rotator is omitted in the rear wheel 20 for simplification of the drawing.

In FIG. 2, electric wires are shown by dot-dash lines. One electric wire connected to the switch 9 is connected to a positive terminal 21 of a battery, an ignition switch 22 and a relay 23. Another electric wire connected to the switch 9 is connected to a solenoid 28 of the above-described electro-magnetic valve 18, an operation display lamp 30, a parking switch 31, a door switch 32 and a buzzer 33.

A solenoid 23a of the relay 23 is connected to a reverse switch 26 and a positive terminal 27 of a battery. When the gears are changed for backward movement, the reverse switch 26 is closed to energize the solenoid 23a, and a movable contact of the relay 23 is changed over to a stationary contact 24. When the reverse switch 26 is opened, the movable contact of the relay 23 is connected to another stationary contact 25, as shown in FIG. 2.

When the ignition switch 22 is closed in the shown condition, and the slide anchor 6 is moved to the left position from the shown position by the operation described with reference to FIG. 1, the switch 9 is closed and current from the positive terminal 21 of the battery flows to the solenoid 28 of the electro-magnetic valve 18 and the operation display lamp 30.

The electro-magnetic valve 18 is of the two-position change-over type. When the solenoid 28 is not energized, it takes one position D by action of a spring 29 so that the conduits 17 and 19 are made to communicate with each other. When the solenoid 28 is energized, it takes another position E so that the conduits 17 and 19 are intercepted from each other.

When the parking brake is not operated, the parking switch 31 is closed, as shown in FIG. 2, and when the parking brake is operated, it is opened. When the door is closed, the door switch 32 is opened, as shown in FIG. 2, and when the door is opened, it is closed. Accordingly, when the switch 9 is closed in the rear wheel 20, and the door is opened without operating the parking brake, the buzzer 33 is energized.

Next, there will be described details of the valve apparatus 16.

A main body 40 has a stepped hole 41. A stepped piston 42 provided with seal rings is slidably fitted into the stepped hole 41. Master cylinder pressure chambers 44 and 45 are formed at both sides of the stepped piston 42, and they always communicate with the pressure generating chambers of the master cylinder 11 through path holes 48 and 46 and the conduits 15, and 47, 13, respectively. The stepped piston 42 is urged leftwards by a spring 43, and so normally contacts with a projection 40a formed on the left end wall of the main body 40.

A radial through hole 49 is made in a smaller diameter portion of the stepped piston 42. Further, an axial stepped hole 50 is made there in communication with the radial through hole 49. A valve ball 52 is arranged in a large diameter portion of the stepped hole 50, and urged to a slant step 50a by a spring 51. The slant step 50a functions as a valve seat.

A rubber ring 53 is attached to the right end surface of the stepped piston 42, and facing to the inner right end wall of the main body 40. It is concentric with a port 54 formed in the inner right end wall. When the stepped piston 42 is moved rightwards, and the rubber ring 53 contacts with a wall portion 40b around the port 54, the master cylinder pressure chamber 44 is intercepted from the port 54. Thus, the wall portion 40b functions as a valve seat.

However, the pressurized fluid from the master cylinder pressure chamber 44 can open the valve ball 52 so that it can flow through the through hole 49, the small-diameter portion of the stepped hole 50, and the port 54 towards the side of the conduit 17. The reverse flow from the side of the conduit 17 is prohibited. Thus, a check valve is constituted by the valve ball 52, the spring 51 and the valve seat 50a.

Next, there will be described operations and functions of the above-described brake control apparatus.

Now, it is assumed that the automobile provided with the above-described brake control apparatus runs on the upwardly inclined road. In FIG. 2, the ignition switch 22 is closed, and the other switches and parts are located at the shown condition.

The brake pedal 12 is trodden to stop the automobile. The pressurized fluid from the master cylinder 11 is supplied through the conduit 13 to the wheel cylinder of the front wheel 14, and supplied through the conduit 15, the port 48 of the valve apparatus 16, the master cylinder pressure chamber 44 thereof, the port 54 thereof, the conduit 17, the electro-magnetic valve 18 of the position D (the switch 9 remains OFF and the solenoid 28 is not energized), and the conduit 19 to the wheel cylinder 2 of the rear wheel 20.

In the valve apparatus 16, the pressure receiving area of the stepped piston 42 is larger at the side of the master cylinder pressure chamber 45 than at the side of the master cylinder pressure chamber 44. When the master cylinder pressure becomes so high that the rightward fluid pressure due to the pressure receiving area difference overcomes the spring force of the spring 43, the stepped piston 42 is moved rightwards, and the rubber ring 53 attached to the top of the stepped piston 42 comes to contact with the valve seat 40b. Hereafter, the pressurized fluid from the master cylinder 11 is supplied to the wheel cylinder 2 of the rear wheel 20 through the master cylinder pressure chamber 44, and the ports 49, 50 only by opening valve ball 52.

The wheels 14 and 20 are braked. Thus, the automobile is decelerated. In the rear wheel 20, the shoes 4a and 4b are pressed to the rotator rotated in the direction shown by the arrow R, but not shown in FIG. 2. The frictional forces occur between the rotator and the shoes 4a and 4b. However, as described with reference to FIG. 1, the brake reaction force to the leading side shoe 4a is larger, and so the slide anchor 6 remains located at the right position as shown in FIG. 2. Thus, the switch 9 remains turned off, and the solenoid 28 of the electro-magnetic valve 18 remains deenergized. It continues to take the position D.

When the automobile stops facing upwardly on the inclined roadway, the torque in the opposite direction to the torque during running occurs in the rotator which has rotated with the wheel. Thus, the frictional force between the rotator and the shoes 4a and 4b is inverted. The brake reaction force to the trailing side shoe 4b becomes larger. Accordingly, the slide anchor 6 is pushed leftwards, and takes the left position. The actuator 9a of the switch 9 is pushed inwards by the switch operating rod 8. The switch 9 is turned on. The solenoid 28 of the electro-magnetic valve 15 is energized. The electro-magnetic valve 18 is changed over to the position E. Thus, the side of the master cylinder 11 is intercepted from the side of the wheel cylinder 2. In that condition, when the driver releases the foot from the brake pedal 12, the brake fluid is returned to the master cylinder 11 from the wheel cylinder of the front wheel 14, but the brake fluid from the wheel cylinder 2 of the rear wheel 20 cannot be returned to the master cylinder 11, since the electro-magnetic valve 18 is in the closed condition. The pressurized brake fluid is held in the wheel cylinder 2 of the rear wheel 20. Thus, the automobile is maintained to stop facing upwardly on the inclined roadway.

In the valve apparatus 16, when the fluid pressure of the master cylinder 11 becomes so low that the rightward fluid pressure force to the stepped piston 42 becomes smaller than the spring force of the spring 48, the stepped piston 42 is moved to the shown position, and so the rubber ring 53 is separated from the valve seat 40b. The side of the conduit 17 is made to free communicate with the master cylinder pressure chamber 44. However, since the electro-magnetic valve 18 is already put into the closed condition, the brake force is kept in the rear wheel 20. The clutch is changed over into the neutral condition. In the prior art, it is necessary to tread the clutch pedal for holding the brake force. In this embodiment, the foot may be released from the clutch pedal.

When the solenoid 28 of the electro-magnetic valve 18 is energized, the operation display lamp 30 lights. Thereby, the driver can know that the electro-magnetic valve 18 operates and the braking force is held.

However, it is considered that the driver goes out of the automobile without applying the parking brake, disregarding or forgetting that fact. In this embodiment, the buzzer 33 buzzes to warn the driver of that fact. When the door is opened without opening the parking switch 31, the door switch 32 is closed, and the buzzer 33 is energized. When the parking brake is applied, the parking switch 31 is opened. Accordingly, the buzzer 33 does not buzz.

In order to start the automobile, the gears are changed over, the clutch pedal is trodden to put the clutch apparatus into the semi-clutch condition and the acceleration pedal is trodden. The drive force is transmitted to the rotator not shown in the rear wheel 20. The frictional force between the rotator and the shoes 4a and 4b is again inverted in direction. The brake reaction force to the leading side shoe 4a becomes larger. Thus, the slide anchor 6 is pushed rightwards to the shown position.

The switch 9 is turned off, and the solenoid 28 of the electro-magnetic valve 18 is deenergized. The electro-magnetic valve 18 takes the position D. The communication between the sides of the master cylinder 11 and wheel cylinder 2 is made. The pressurized fluid held in the wheel cylinder 2 is returned into the master cylinder 11 through the valve apparatus 16 located in the shown condition. Thus, the brake is relieved and the automobile starts to run.

When the automobile is positively moved backwards on the upwardly inclined roadway, the gears are changed over for backward movement. The reverse switch 26 is closed to energized the relay 23. Thus, the movable contact is changed over to the other stationary contact 24. The switch 9 is deenergized. The electro-magnetic valve 18 takes the position D. The pressurized fluid in the wheel cylinder 2 of the rear wheel 20 is returned to the master cylinder 11. Thus, the automobile can be freely moved backwards.

In the above, there has been described the normal case of the operation that the automobile stops upwardly facing on the inclined roadway. However, when the automobile is rapidly braked on an inclined roadway of some angle or when the automobile provided with some suspension mechanism is rapidly braked on an inclined roadway, it is considered that the switch 9 in the rear wheel 20 cannot be stably maintained at the turned-on state. The valve apparatus 16 is provided for such a case.

When the automobile is rapidly braked in that case, there occurs so-called "nose-dive" phenomenon. Thus, the rear wheel side of the body tends to separate from the ground. Then, the body swings back and the rear wheel side of the body sinks down. And the body swings back and there occurs again "noise dive" phenomenon.

At the first "nose-dive", the switch 9 remains turned off, and at the swing-back, it is turned on. However, at the next "nose-dive", it is turned off. Thus, the switch 9 is not stably turned on with the stop of the automobile. As the result, the automobile is maintained to stop almost by the back torque of the front wheel, while the brake pedal remains trodden. The switch 9 is not always turned on after sufficiently long time. The valve apparatus 16 is provided for preventing such a case.

When the brake pedal is rapidly trodden and released from treading, the pressurized fluid begins to be returned to the master cylinder 11 from the wheel cylinder of the front wheel 14. However, the stepped piston 42 remains located at the right position in the valve apparatus 16, and the rubber ring 53 remains seating on the valve seat 40b, so long as the master cylinder pressure does not decrease so much. Accordingly, the pressurized fluid cannot be returned to the master cylinder 11 from the wheel cylinder 2 of the rear wheel 20. While the rubber ring 53 remains seating on the valve seat 40b, the back torque of the front wheel 14 decreases, and that of the rear wheel 20 increases, due to the tendency of the backward movement of the automobile. Thus, the switch 9 in the rear wheel 9 is turned on. Hereafter, the turn-on is maintained.

After the switch 9 is turned on, the master cylinder pressure is so decreased that the rightward fluid pressure force to the stepped piston 42 becomes smaller than the sum of the leftward fluid pressure force to the stepped piston 42 and spring force of the spring 43, and the stepped piston 42 is moved leftwards to the shown position. The free comminication between the sides of the conduit 17 and master cylinder pressure chamber 44 is made, but the electro-magnetic valve 18 is always closed. Accordingly, the pressurized fluid cannot be returned to the master cylinder 11 from the wheel cylinder 2, but the braking force is held. The start of the automobile is effected in the same manner as above described for the normal case.

Figure 3:
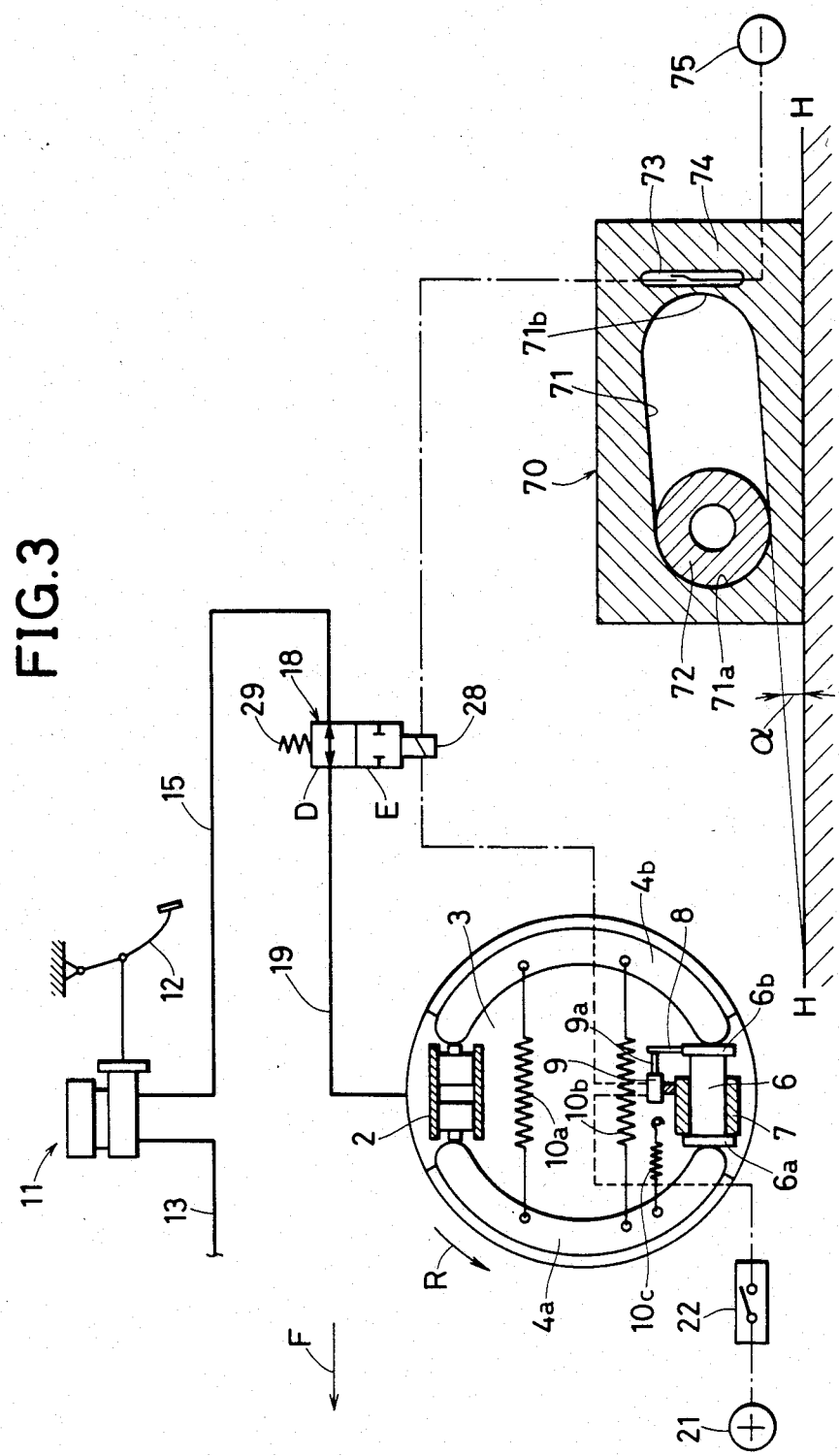
FIG. 3 is a schematic view of a brake control apparatus according to a second embodiment of this invention.

Next, there will be described a brake control apparatus according to a second embodiment of this invention with reference to FIG. 3. Parts in FIG. 3 which correspond to those in FIG. 1 and FIG. 2, and denoted by the same reference numerals, the description of which will be omitted.

In this embodiment, an inclination detection switch 70 is connected in series with the switch 9 and the solenoid 28 of the electro-magnetic valve 18.

An inclined hollow 71 is made in a switch body 74. A roll 72 made of permanent magnet is rollably arranged in the inclined hollow 71. An inclination angle α of the bottom surface of the inclined hollow 71 relative to a horizontal line H—H is about two degrees. When the automobile runs on a horizontal roadway or on an almost horizontal roadway, the roll 72 contacts with a lower end surface 71a of the hollow 71 as shown in FIG. 3.

A reed switch 73 is arranged adjacent to an upper end surface 71b of the hollow 71 in the switch body 74. One contact of the read switch 72 is connected to the solenoid of the electro-magnetic valve 18, and another contact of the reed switch 73 is connected to a negative terminal 75 of the battery. The reed switch 73 is opened in the shown condition. When the automobile runs facing upwardly on an inclined roadway, the roller 72 is rolled to contact with the upper end surface 71b of the hollow 71. Thus the reed switch 73 is closed by magnetic force of the roller 72. In FIG. 3, the arrow F shows the forward direction of the automobile.

The normal operation of the automobile facing upwardly on the inclined roadway is the same as in the first embodiment. Since the reed switch 73 is closed, the solenoid 28 of the electro-magnetic valve 18 is energized with the turn-on of the switch 9.

Next, there will be described the case that the automobile stops on the horizontal roadway or on the almost horizontal roadway.

The roller 72 is located at the shown position. Thus, it contacts with the lower end surface 71a. Accordingly, the reed switch 72 is opened. It is now assumed that the suspension mechanism greatly shakes by the rapid brake, and the body swings forth (nose-dive) and back. There is then the possibility that the slide anchor 6 is moved leftwards to close the switch 9. If the inclination detection switch 70 is not provided, the solenoid 28 of the electro-magnetic valve 18 would be energized. However, according to this embodiment, it is not energized. The inclination detection switch 70 detect that the automobile runs on the horizontal roadway or on the almost horizontal roadway, and so the reed switch 72 is opened. The solenoid 28 of the electromagnetic valve 18 is not energized with the turn-on of the switch 9. The braking force is not held. Accordingly, the automobile can smoothly start to run.

While the preferred embodiments have been described, variations thereto will occur to those skilled in the art within the scope of the present inventive concepts which are delineated by the following claims.

For example, in the above embodiments, the braking force to the rear wheel 20 connot be increased for the automobile stopped facing upwardly on the inclined roadway. A check valve which permits the fluid flow towards the wheel cylinder 2 from the master cylinder 11, may be connected in parallel with the electro-magnetic valve 18. The pressurized fluid can be further supplied through the check valve to the wheel cylinder 2.

Further, in the above embodiments, the braking force is held only in the rear wheel 20. When force is held only in the rear wheel 20. When it is not sufficient to stop the automobile on the inclined roadway, it may be held also in the front wheel 14. For example, a valve apparatus as already proposed, may be arranged between the master cylinder and the wheel cylinder of the front wheel. The valve apparatus is closed by the fluid pressure of the rear wheel. Instead of it, the valve apparatus 16 in the first embodiment may be used. In that case, the conduit 15 from the master cylinder 11 is directly connected to the electro-magnetic valve 18, the conduit 13 to the port 48 of the valve apparatus 16, the wheel cylinder 2 of the rear wheel 20 to the port 46 thereof and the wheel cylinder of the front wheel 14 to the port 54.

In the above embodiments, the slide anchor 6 is used. Instead of it, a stationary anchor may be used, and a strain gauge may be attached to the stationary anchor. The electro-magnetic valve is energized or doenergized by the detection output of the strain gauge. Or the movement of the slide anchor 6 may be transmitted to a mechanical valve.

In the above, the change of the direction of the frictional force has been described in the drum brake mechanism. However, that may be detected in a pad of a disk brake mechanism.

Further, in the first embodiment, a clutch switch may be used instead of the parking switch 31. In that case, the clutch switch is opened by treading the clutch pedal.

Further, in the second embodiment, the magnet roller 72 is used for closing the reed switch 73 in the inclination detection switch 70. The shape is not limited to it. It may be ball-like or parallel-piped.

Further, a pendulum may be used for detecting an inclined roadway. In that case, it may be contacted with an electrical contact on the inclined roadway.

What is claimed is:

1. A brake control apparatus of the drum brake type for a vehicle comprising:
  (a) a brake apparatus in which a brake friction means comprising a leading shoe and a trailing shoe is pressed to a frictional surface of a rotator rotated with a wheel by a supply of pressurized fluid on the basis of a driver's operation;
  (b) conduit means for supplying said pressurized fluid to said brake apparatus from a master cylinder;
  (c) a valve arranged in said conduit means, being closed by an external instruction and prohibiting at least a fluid flow from said brake apparatus side towards said master cylinder side for holding the braking force;
  (d) detecting means for detecting one directional movement of said brake friction means due to a backward rotational force of a wheel and another directional movement of said brake friction means due to a forward rotational force of said wheel during pressing of said brake friction means to said frictional surface of said rotator, said brake friction means being able to move within a predetermined range in accordance with the torque of said wheel; and
  (e) valve drive means for closing said valve in accordance with the detection of said one directional movement by said detecting means, and for opening said valve in accordance with the detection of said other directional movement by said detecting means; said brake apparatus further includes a stationary anchor having a through hole, and said detecting means includes a slide anchor slideably fitted in said through hole movable between a first position and a second position, said leading shoe and said trailing shoe being engaged with said slide anchor to move said slide anchor between said first and second positions, respectively, and an electrical switch for detecting the movement of said slide anchor from said first position to said second position, and said valve being of the electro-magnetic type, being closed in said second position and opened in said first position by the detecting output of said electrical switch, said brake apparatus further includes a spring extending between a stationary part and said leading shoe, said leading shoe being always pushed to said slide anchor by said spring, so that said slide anchor is forcibly put in said first position and said electrical switch is stably maintained at the off state wherein said slide anchor is moved to said second position against said spring with the torque of said wheel when said vehicle is stopped by the braking force on an upwardly inclined roadway, and said apparatus includes a parking switch, a door switch and a warning means which are connected in series with said electrical switch, said parking switch being actuated in response to operation of the parking brake of the vehicle, said door switch being actuated in response to the opening-closing operation of the door of the vehicle, and said warning means being energized to warn the driver that the parking brake is not applied when said door is opened without operating the parking brake and said valve is closed by the closing of said electrical switch.

2. A brake control apparatus for a vehicle comprising:
  (a) a brake apparatus in which brake friction means is pressed to a frictional surface of a rotator rotated with a wheel by supply of pressurized fluid on the basis of a driver's operation;
  (b) conduit means for supplying said pressurized fluid to said brake apparatus from a master cylinder;
  (c) a valve arranged in said conduit means, being closed by an external instruction and prohibiting at least a fluid flow from said brake apparatus side towards said master cylinder side for holding the braking force;
  (d) detecting means for detecting one directional movement of said brake friction means due to a backward rotational force of a wheel and another directional movement of said brake friction means due to a forward rotational force of said wheel during pressing of said brake friction means to said frictional surface of said rotator, said brake friction means being able to move within a predetermined range in accordance with the torque of said wheel;

(e) valve drive means for closing said valve in accordance with the detection of said one directional movement by said detecting means, and for opening said valve in accordance with the detection of said other directional movement by said detecting means;

(f) a parking switch being actuated in response to operation of the parking brake of the vehicle;

(g) a door switch being actuated in response to opening-closing operation of the door of the vehicle; and (h) warning means energized to warn the driver of the brake apparatus holding without the parking brake being applied when said door is opened without operating the parking brake while said valve is closed by said valve drive means, said parking switch, door switch and warning means being connected in series with said valve drive means.

3. A brake control apparatus for a vehicle according to claim 1 or 2, in which said vehicle includes front and rear wheels, and said brake control apparatus further comprises a valve apparatus arranged between said master cylinder and said front and rear wheels, and when the brake is relieved, the pressurized fluid is returned initially and preferentially from said front wheel into said master cylinder.

4. A brake control apparatus for a vehicle according to claim 3, in which said valve includes a stepped piston which receives at the larger area side the master cylinder pressure for said rear wheel and at the smaller area side the master cylinder pressure for said front wheel.

* * * * *

UNITED STATES PATENT AND TRADEMARK OFFICE
CERTIFICATE OF CORRECTION

PATENT NO. : 4,792,023

DATED : December 20, 1988

INVENTOR(S) : Shoichi Washizu, Takeshi Morijiri, Kazuo Kogure, Hideyuki Morimoto, Ryuichi Tanaka It is certified that error appears in the above—identified patent and that said Letters Patent is hereby corrected as shown below:

On the title page, item [75], the inventors should be listed as follows:

Shoichi Washizu, Takeshi Morijiri, Kazuo Kogure,
Hideyuki Morimoto, Ryuichi Tanaka, all of Kanagawa,
Japan.

Signed and Sealed this

Twenty-fourth Day of July, 1990

Attest:

HARRY F. MANBECK, JR.

*Attesting Officer*  *Commissioner of Patents and Trademarks*